United States Patent [19]

Kubo et al.

[11] Patent Number: 4,676,123
[45] Date of Patent: Jun. 30, 1987

[54] AUTOMOBILE TRANSMISSION WITH OUTPUT SHAFT PARALLEL TO CRANK SHAFT AND PARKING GEAR FIXED TO THE OUTPUT SHAFT

[75] Inventors: Seitoku Kubo; Koujiro Kuramochi; Tatsuo Kyushima, all of Toyota, Japan

[73] Assignee: Toyota Jidosha Kogyo Kabushiki Kaisha, Japan

[21] Appl. No.: 834,659

[22] Filed: Feb. 28, 1986

Related U.S. Application Data

[60] Continuation of Ser. No. 637,280, Aug. 3, 1984, abandoned, which is a division of Ser. No. 262,786, May 11, 1981, Pat. No. 4,480,499.

[30] Foreign Application Priority Data

Apr. 24, 1978 [JP] Japan ................................. 53-49063

[51] Int. Cl.$^4$ ............................................. F16H 37/08
[52] U.S. Cl. ................................... 74/695; 192/4 A
[58] Field of Search ............. 74/695, 411.5; 192/3 H, 192/4 A

[56] References Cited

U.S. PATENT DOCUMENTS

| | | | |
|---|---|---|---|
| 1,849,727 | 3/1932 | Shinkle | 192/4 A |
| 2,093,236 | 9/1937 | Dodge | 74/740 |
| 2,747,430 | 5/1956 | Förster et al. | 192/4 A X |
| 2,770,326 | 11/1956 | Wayman | 192/4 A X |
| 3,035,455 | 5/1962 | Peras | 74/645 |
| 3,095,764 | 7/1963 | Peras | 74/763 |
| 3,302,740 | 2/1967 | Giacosa | 180/297 |
| 3,339,431 | 9/1967 | Crosswhite et al. | 74/688 |
| 3,411,382 | 11/1968 | Mori | 74/688 |
| 3,482,469 | 12/1969 | Mori | 74/763 |
| 3,561,291 | 2/1971 | Webster et al. | 74/740 |
| 3,572,169 | 3/1971 | Fisher | 74/763 |
| 3,601,231 | 8/1971 | Kolacz et al. | 192/4 A X |
| 3,602,055 | 8/1971 | Hause et al. | 74/759 |
| 3,614,902 | 10/1971 | Candellero | 74/695 |
| 3,800,626 | 4/1974 | Koivunen | 74/695 |
| 3,802,294 | 4/1974 | Smirl | 74/759 |
| 3,812,739 | 5/1974 | Mori et al. | 74/763 |
| 3,926,073 | 12/1975 | Roche et al. | 74/753 |
| 3,958,655 | 5/1976 | Kronogard | 180/297 |
| 3,977,272 | 8/1976 | Neumann | 74/695 X |
| 3,979,973 | 9/1976 | Klaue | 74/740 |
| 4,043,223 | 8/1977 | Ohnuma et al. | 74/688 |
| 4,056,986 | 11/1977 | Hobbs | 74/701 X |
| 4,056,988 | 11/1977 | Kubo et al. | 74/740 |
| 4,095,487 | 6/1978 | Cartwright et al. | 74/695 |
| 4,157,046 | 6/1979 | O'Malley | 74/763 |

FOREIGN PATENT DOCUMENTS

| | | | |
|---|---|---|---|
| 1177949 | 9/1964 | Fed. Rep. of Germany | 74/695 |
| 2722891 | 12/1977 | Fed. Rep. of Germany | . |
| 2733538 | 2/1978 | Fed. Rep. of Germany | 192/4 A |
| 7530245 | 4/1976 | France | . |
| 2289813 | 5/1976 | France | 74/695 |
| 1277694 | 6/1972 | United Kingdom | 192/4 A |

OTHER PUBLICATIONS

Chrysler Corporation-1978 Service Manual, Plymouth Horizon and Dodge Omni, FIG. A-404, pp. 21-43.

Primary Examiner—Allan D. Herrmann
Assistant Examiner—Dirk Wright
Attorney, Agent, or Firm—Finnegan, Henderson, Farabow, Garrett & Dunner

[57] ABSTRACT

An improved transverse-mount type driving device for an automobile, having an output gear provided between last and intermediate planetary gear units of an auxiliary speed change gear assembly, the output gear meshing with a driven gear on a transmission shaft which extends parallel with the auxiliary speed change gear assembly and mounts a drive gear at an end proximate of the torque converter for meshing engagement with a differential drive gear which in turn transmits power to right and left axle shafts. A parking gear is provided on the transmission shaft for selective engagement to prevent rotation of the transmission shaft when the automobile is in park.

4 Claims, 4 Drawing Figures

4,676,123

AUTOMOBILE TRANSMISSION WITH OUTPUT SHAFT PARALLEL TO CRANK SHAFT AND PARKING GEAR FIXED TO THE OUTPUT SHAFT

CROSS-REFERENCES TO RELATED APPLICATIONS.

This application is a continuation of application Ser. No. 06/637,280, filed Aug. 3, 1984, now abandoned, which is a division of application Ser. No. 06/262,786, filed May 11, 1981, now U.S. Pat. No. 4,480,499.

BACKGROUND OF THE INVENTION

1. Field of the Invention:

This invention relates to a driving device for an automobile, and more particularly to a driving device available for a front-wheel driving type or a rear-wheel driving type automobile having a transversely mounted engine, which comprises a combination of automatic speed change gear assembly and final reduction gear.

2. Description of the Prior Art:

With a view to affording an increased space to automobiles, front-wheel driving type automobiles are becoming increasingly popular. Such automobiles have advantages of a compact driving device, reduction in weight of the vehicle itself, an reduction in fuel consumption.

If an automatic speed change gear assembly providing the four forward speed range drive and one reverse drive is incorporated in the driving device for a front-wheel driving type automobile having a transversely mounted engine, in order to reduce fuel consumption to greater extent as well as to reduce noise, then it follows that the over-all length of the driving device increases, thus causing interference with the suspension device of the automobile. This imposes an adverse influence particularly on so-called compact cars.

SUMMARY OF THE INVENTION

It is accordingly an object of the present invention to provide a driving device for use in automobiles, wherein at least an automatic speed change gear for providing the four-forward speed range drive and one reverse drive is incorporated, and the length of the driving device is reduced, thereby eliminating interference with the automobile's suspension unit.

In order to accomplish this object, the present invention is a driving device for automobiles, comprising: a fluid type torque converter; an auxiliary speed change gear assembly mounted coaxially with the torque converter to transmit power from the torque converter; a transmission shaft mounted parallel with the axis of the auxiliary speed change gear assembly; an output gear splined to an output member of a last planetary gear unit of the auxiliary speed change gear assembly at a position between a driven gear mounted on the transmission shaft and meshed with the output gear; a differential gear for transmitting to right and left axle shafts the power received from a drive gear mounted on the other end of the transmission shaft disposed proximate to the torque converter; a parking gear disposed for rotation with the transmission shaft; and means for selectively engaging the parking gear to prevent rotation of the transmission shaft when the automobile is in park range.

DESCRIPTION OF THE PREFERRED EMBODIMENTS

Figure 1:
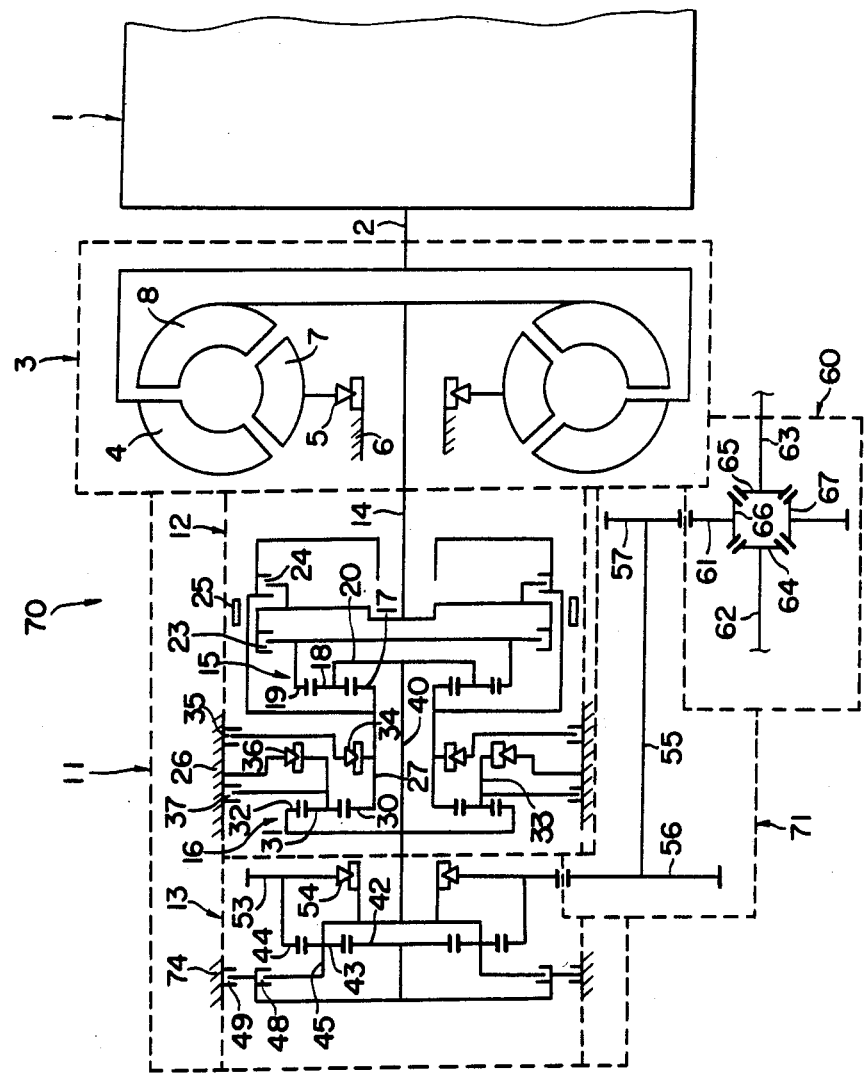
FIG. 1 shows the skeleton of a driving device according to the present invention.

In FIG. 1, an engine and a driving device are shown as a skeleton view, wherein an internal combustion engine 1 is transversely placed at right angles with respect to the axis of an automobile between two wheels (rear wheels or front wheels, not shown). The crank shaft 2 of the engine 1 is connected to an automatic speed change gear device 70 of the driving device. This driving device consists of automatic speed change gear device 70 and a final reduction gear 60. Automatic speed change gear device 70 includes a fluid type torque converter 3, an auxiliary speed change gear 11 and a transmission gear 71, and is attached to engine 1 transversely of the automobile. Fluid type torque converter 3 is of a known structure and includes a pump impeller 4 coupled to crank shaft 2, a stator 7 connected by way of a one-way clutch 5 to a stationary portion 6, and a turbine runner 8.

Auxiliary speed change gear assembly 11 includes an underdrive 12 and an overdrive 13 which are mounted coaxially with crank shaft 2. An input shaft 14 of underdrive 12 is coupled to turbine runner 8. Underdrive 12 includes first and second planetary gear units 15 and 16. The first planetary gear unit includes a sun gear 17, planetary pinions 18, a carrier 20 supporting rotatably planetary pinions 18, and a ring gear 19.

A clutch 23 controls the connection between input shaft 14 and ring gear 19, and a clutch 24 controls the connection of input shaft 14 with a sun gear shaft 27 connected to sun gear 17. A brake 25 governs the connection of sun gear 17 with a fixed drive case 73. Second planetary gear unit 16 includes a sun gear 30, planetary pinions 31, a ring gear 31, and a carrier 33 supportng planetary pinions 31 rotatably. Sun gear 30 is connected to sun gear shaft 27, and a one-way clutch 34 and a brake unit 35 are provided in series between sun gear shaft 27 and drive case 73. A one-way clutch 36 and a brake unit 37 are provided in parallel between carrier 33 and drive case 26. One-way clutches 34 and 36 are coaxial with each other as viewed in the radial direction, and placed one upon another as viewed in the axial direction.

An intermediate shaft 40 extending through the center of auxiliary speed change gear assembly 11 is coaxial with input shaft 14 and connected to carrier 20 and ring gear 32, so that power from under-drive 12 is transmitted to over-drive 13. Over-drive 13 includes a planetary gear unit 41. Planetary gear unit 41 includes a sun gear 42, planetary pinions 43, a ring gear 44, and a carrier 45 supporting planetary pinions 43 rotatably. Carrier 45 is coupled to intermediate shaft 40. A clutch unit 48 governs the connection of carrier 45 with sun gear 42, and a brake unit 49 governs the connection of sun gear 42 with auxiliary case 74. Ring gear 44 is equivalent to the output of over-driven unit 13, and an output gear 53 is connected to ring gear 44 integrally therewith. A one-way clutch 54 governs the connection of carrier 45 and ring gear 44 with output gear 53.

Referring to transmission gear 71, a transmission shaft or a counter shaft 55 extends substantially in parallel to intermediate shaft 40, and has at one end a driven gear 56 meshing with output shaft 53 and at the other end thereof a drive gear 57. In order to position final reduction gear 60 substantially centrally of a vehicle in the transverse direction thereof, drive gear 57 is positioned nearer to torque converter 3 than driven gear 56 is. Drive gear 57 is meshed with a gear 61 of final reduction gear 60. Final reduction gear 60 is of a known structure, wherein left and right axles 62 and 63 extend from side gear 64 in parallel to the axis of auxiliary speed change gear assembly 11. Axles 62 and 63 are connected to left and right front wheels (not shown). Shafts which rotatably support pinions 66 and 67 meshing with side gears 64 and 65 rotate along with gear 61.

Operation of auxiliary speed change gear assembly will be more in detail described with reference to the following table.

TABLE

| Speed range | 23 | 24 | 25 | 35 | 37 | 34 | 36 | 48 | 49 | 54 |
|---|---|---|---|---|---|---|---|---|---|---|
| First speed | o | | | o | | Δ | o | | | Δ |
| Second speed | o | o | o | | Δ | | o | | | Δ |
| Third speed | o | o | | | | | o | | | Δ |
| Over-drive | o | o | | | | | | | o | |
| Reverse | | o | | o | | | o | | | Δ |

In this table, numerical figures represent the clutch units, brake units and one-way clutches shown, respectively; a circular mark (o) represents that clutch units and brake units are brought into engagement; and a triangular mark (Δ) represents that one-way clutches are brought into an engagement when an engine is run. Engagement and disengagements of each clutch and brake are governed by supply of an oil pressure from an oil pressure unit to an oil pressure servo mechanism constituting such units and discharge of the oil pressure from the servo mechanism.

Figure 2A:
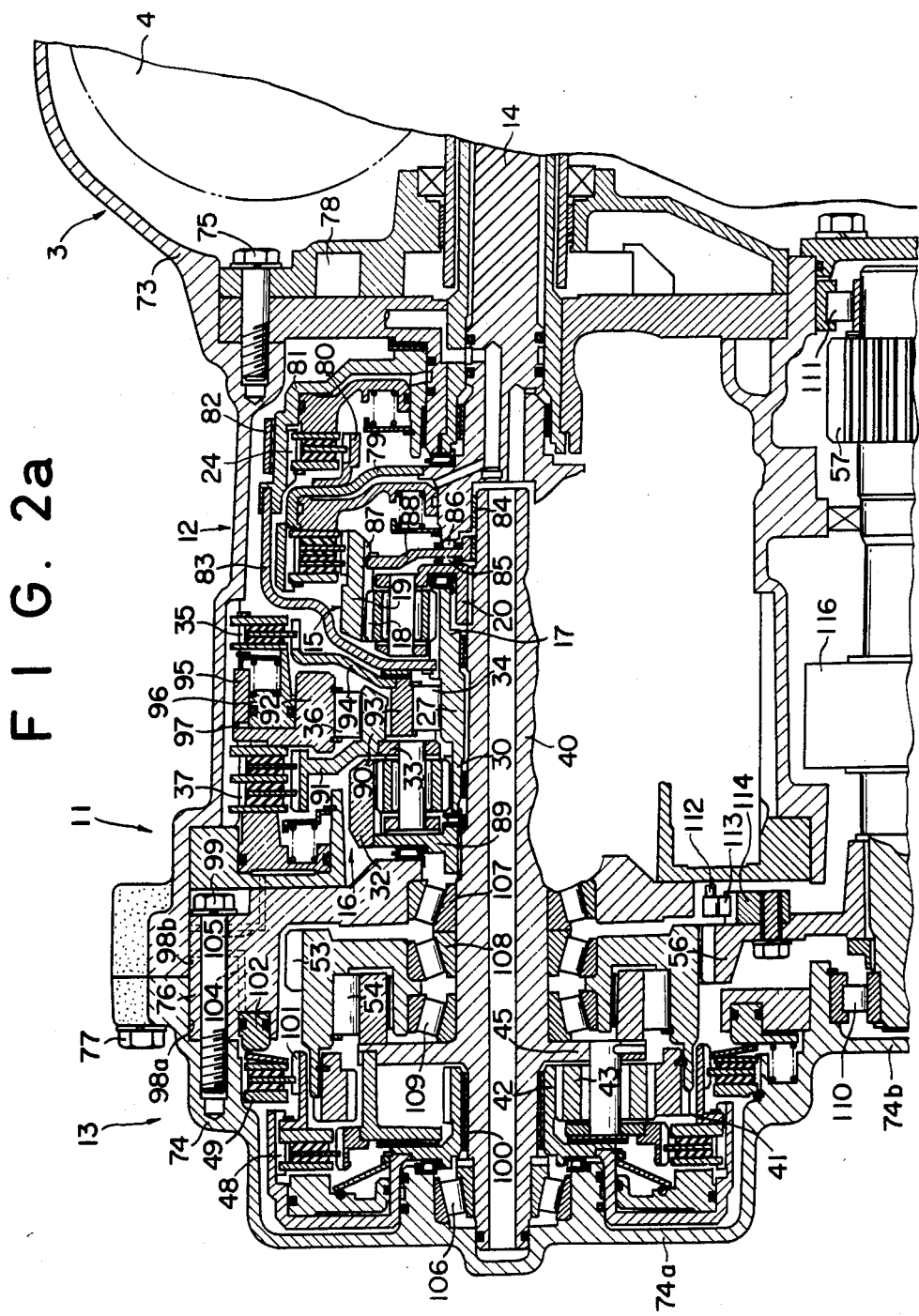
FIGS. 2a and 2b are cross-sectional views, partly omitted, of the driving device, respectively; and, FIG. 3 shows the positional relationship of the driving device of the present invention versus the suspension device of an automobile.
Figure 2B:
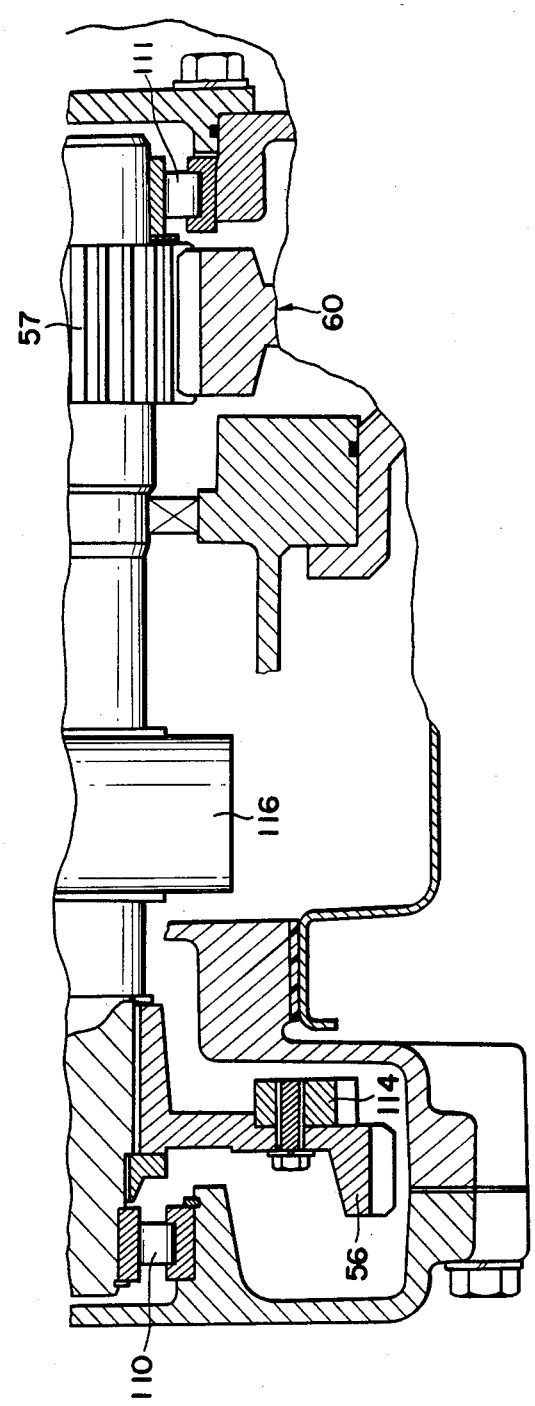

FIGS. 2a and 2b show an example of the automatic speed change gear and transmission gear in the driving device. Respective components will be more in detail described in conjunction with these drawings.

The driving device includes; a drive case 73 housing therein fluid type torque converter 3, underdrive 12 of auxiliary speed change gear assembly 11 coaxial with torque converter 3, transmission gear assembly 71 located under auxiliary speed change gear assembly 11 near to the left side as viewed in FIG. 1, and final reduction gear assembly 60 located under transmission gear assembly 71; and an auxiliary case 74 substantially housing therein overdrive 13 coaxial with underdrive 12. Drive case 73 is bolted at one end to the right side surface of the engine at several points (not shown) and bolted at the other end to auxiliary case 74 at several points as at 77, in a manner to enclose a cylindrical case 76 to be described later.

Underdrive 12 is positioned in drive case 73 on the engine side thereof, and an oil pump 78 is bolted as at 75 to drive case 73, which in turn is mounted on the input shaft, the aforesaid oil pump serving as an oil pressure source for supplying an oil pressure and a working oil by way of an oil pressure control unit (not shown) to the respective clutches, brake units and the fluid torque converter.

In underdrive 12 on the engine side thereof, there are provided clutch units 23 and 24 which are connected to each other through the medium of a drum 79 and a hub 80 which are welded to input shaft 14 of auxiliary speed change gear 11, and a brake band 82 of brake unit 25 wound to the outer periphery of a drum 81 of clutch unit 24, in order to arrest a sun gear shaft 27 at a locked position. Provided in the unit 12 on the other side thereof are two planetary gear units 15 and 16 connected to a hollow sun gear shaft 27 coaxial with input shaft 14 and having teeth at each end thereof.

Sun gear shaft 27 is spline-fitted, through the medium of a drive 83 involving therein clutch unit 23 and planetary gear unit 15, on the outer periphery of drum 81 of clutch unit 24. The teeth at the opposite ends of sun gear shaft 27 serve as sun gears 17 and 30 for planetary gear units 15 and 16. The planetary gear unit 15 is thus composed of; pinion 18 meshing with sun gear 17 and rotatably supported by carrier 20; and ring gear 19 meshing with pinion 18.

Ring gear 19 is connected to clutch unit 23, and intermediate shaft 40 is supported at one end by input shaft 14 through the medium of a bush 84, extends through sun gear shaft 27, and carried at the other end by a cylindrical case 76 and auxiliary case 74 through the medium of bearings. Carrier 20 is spline-fitted on intermediate shaft 40.

A disc 88 is disposed between carrier 20 and the one end of input shaft 14 and spline-fitted on intermediate shaft 40 for being supported thereby. Ring gear 19 has an outer peripheral surface spline-fitted in clutch unit 23 and an inner peripheral surface spline-fitted in disc 88, so that disc 88 may receive a thrust.

Sun gear 17 is spline-fitted in drive 83.

A ring gear 32 of planetary gear unit 16 is spline-fitted on intermediate shaft 40 through the medium of a hub 89. Carrier 33 is connected through the medium of a hub 91 to a brake unit 37 positioned above the outer periphery of planetary gear unit 16, so as to be locked at the first speed driving engine coast, the aforesaid hub being formed integrally with an inner race 90 of a one-way clutch 36 brought into engagement at the first speed drive. One-way clutch 36 is provided between two planetary gear units 15 and 16, as viewed in the axial direction. One-way clutch 34 adapted to be brought into engagement with sun gear shaft 27 at the second speed drive is disposed between the radially inner surface of an inner race 90 of one-way clutch 36 and sun gear shaft 27. An outer race 92 of one-way clutch 36 is spline-fitted in drive case 73 on the right side of brake unit 37, as viewed in FIG. 2a. This outer race is provided with a servo mechanism 95 for brake unit 35, in order to fix outer race 93 of one-way clutch 34 through the medium of a hub 94 to drive case 73.

It should be noted that these one-way clutches 34 (for use in the second speed drive) and 36 (for use in the first speed drive) are placed radially in superposed relation to each other in a space defined by two planetary gear units 15 and 16, and the servo mechanism of brake unit 35 for one-way clutch 34 is provided on the outer race 92 of one-way clutch 36. Such placement thus results in the compactness in size of the device itself, particularly reduction in the length of auxiliary speed change gear 11.

Auxiliary case 74 housing therein overdrive unit 13 is bolted at several points as at 77 to one end of drive case 73. An inverted U-shaped cylindrical case 76 is fitted in the diametrically equal inner cylindrical portions defined by the inner walls 98a and 99b of auxiliary case 74 and drive case 73 in the joint portion therebetween. Cylindrical case 76 is bolted at two or more points as at 99 to auxiliary case 74.

In assembling overdrive 13 and intermediate shaft 40 are placed at first in auxiliary case 74, and cylindrical case 76 is fitted in auxiliary case 74, then fitted in cylindrical portion 98b of drive case 73, and bolted thereto as at 77.

Overdrive 13 is incorporated in a space defined by auxiliary case 74 and cylindrical case 76, as has been described earlier. Carrier 45 supporting pinion 43 of planetary gear unit 41 rotatably is formed integrally with intermediate shaft 40, the aforesaid planetary gear being disposed substantially in the central portion of the aforesaid space. Hollow sun gear 42 is connected through the medium of clutch unit 48 provided in one end portion of auxiliary case 74 to carrier 45, the aforesaid sun gear being in mesh with pinion 43, supported through the medium of bush 100 by intermediate shaft 40, and connected through the medium of a cylindrical hub 101 spline-fitted in clutch unit 48 to brake unit 49 which is located between the inner peripheral wall of auxiliary case 74 and planetary gear unit 41, in order to secure sun gear 42 to auxiliary case 74.

Servo mechanism 102 for brake unit 49 is disposed within cylindrical case 76, which has oil passages 104 and 105 for supplying an oil pressure to servo mechanism 102 and another servo mechanism 103 for brake unit 37. Output gear 53 which is an output member of auxiliary speed change gear assembly 11 is spline-fitted on a member provided between planetary gear unit 41 and cylindrical case 76 as well as ring gear 44 of planetary gear unit 41.

Further, a one-way clutch 54 is provided inside the output gear 53 for holding the unit planetary gear system 41 in locked state by connecting the carrier 45 with the ring gear 44 thereof, the outer race of the one-way clutch 54 being used commonly with the output gear 53. Since one-way clutch 54 is placed within the member serving as an output gear, there results a compact overdrive unit 13 as well as reduction in length of the driving device.

To the effect that intermediate shaft 40 is rotatably supported by drive case 73 and auxiliary case 74, a first thrust bearing 106 is placed between one end of intermediate shaft 40 and auxiliary case 74, and a second thrust bearing 107 is placed between intermediate shaft 40 and cylindrical case 76. These thrust bearings are so arranged as to receive a thrust acting on intermediate shaft 40 just in the opposite directions when an automobile is run forward and backward.

A third thrust bearing 108 abutting second thrust bearing 107 is placed between intermediate shaft 40 and output gear 53, and a fourth thrust bearing 109 adjoining third thrust bearing 108 and contacting carrier 45 is placed between intermediate shaft 40 and output gear 53.

Third and fourth bearings 108 and 109 are so arranged as to receive a thrust acting on intermediate shaft 40 in the opposite directions when an automobile is run forward and backward.

The first and fourth thrust bearings 106 and 109 receive a thrust in the rotational direction, while the second and third thrust bearings 107 and 108 receive a rightward thrust as seen in the figure.

Output gear 53 is in mesh with driven gear 56 mounted on one end of a transmission shaft 55 which is rotatably carried at the opposite ends thereof by bearings 110 and 111.

Drive gear 57 mounted on the other end of transmission shaft 55, which is near to the engine, is in mesh with ring gear 57 of final reduction gear 60, so that the drive force from output gear 53 is transmitted to final reduction gear 60.

Driven gear 56 is diametrically larger than driving gear 57 and has a parking gear 114 formed integrally therewith. When an operator shifts a shift lever within a driver's room to the P(parking) range, then a pawl 113 is brought into engagement with parking gear 114 by way of a transmission link member 112, thereby arresting the driven gear at the locked position.

An oil pressure governer unit 116 for detecting a speed of a vehicle is mounted on transmission shaft 55 between drive gear 57 and driven gear 56.

By placing output gear 53 meshing with driven gear 56 of transmission gear assembly 71 in the front portion of overdrive unit 13 stated otherwise, by placing output gear 53 in a portion nearer to the engine, rather than to planetary gear 41, it follows that an axially outer end portion 74b (cap 142) of transmission gear assembly 71 is indented axially inwardly toward the engine side, as viewed from the end portion 74a of auxiliary speed change gear assembly 11 of auxiliary case 74. Viewing from another angle, clutch unit 48 or a brake unit 73 for over-drive unit 13 is housed in the projecting portion 74a of auxiliary case 74 of auxiliary speed change gear 11.

A strut bar (also serving as a stabilizer) of a strut type suspension device is slidably provided sideways of the end portion 74b and below projecting portion 74a of auxiliary case 74.

Figure 3:
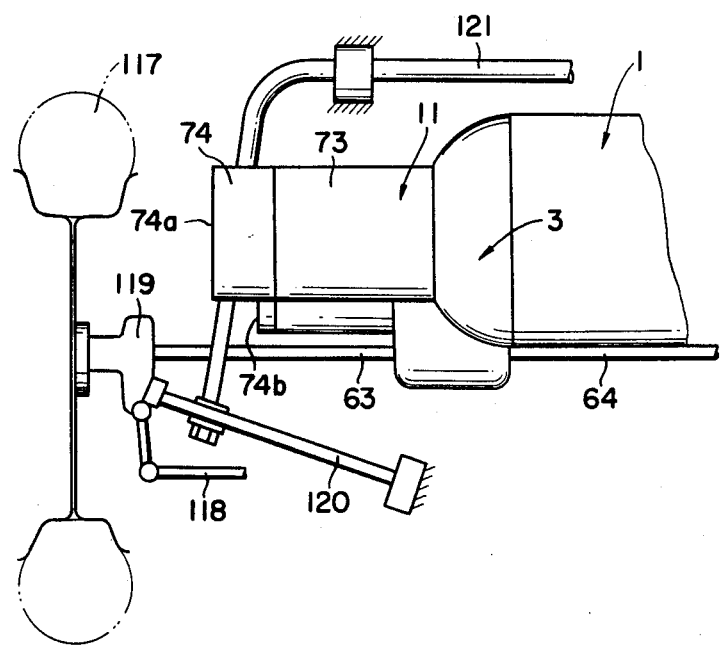

In FIG. 3, the strut bar of the suspension device (serving as a stabilizer as well) is slidably disposed.

FIG. 3 schematically shows the positional relationship of the suspension device with the driving device.

In this drawing, wheels 117 are connected by way of a steering knuckle 119 to an axle 63 and a tie rod 118 in manner to rotate freely and to be freely steered. A lower arm 120 and a strut bar 121 (serving as a stabilizer as well) of the strut type suspension device are connected to steering knuckle 119, so as to fix wheels 117 to the chassis.

Stabilizer 121 is disposed below auxiliary case 74 housing therein overdrive unit of automatic speed change gear 11 and sideways the projecting portion 74a of auxiliary case 74.

As will be understood from the foregoing detailed description of preferred embodiment, the output gear of the last planetary gear system (most distant from the engine) in the gear train of the auxiliary speed change gear assembly is meshed with the driven gear of the transmission gear assembly which is located beneath and along one side of the auxiliary speed change gear assembly to transmit the power to the final reduction gear on the side of the engine, so that it becomes possible to mount the component parts of the suspension in a space which becomes available beneath the auxiliary speed change gear assembly and on one side of the transmission assembly without interference with the drive mechanism.

This effect will become more apparent by reference to Japanese Patent Application No. 18112/1978 by the same applicant, which discloses a drive device with the output gear of the auxiliary speed change gear assembly located at a position most distant from the engine.

In addition to the above-mentioned effect, it becomes possible to shorten the transmission shaft and to reduce the weight of the drive mechanism as a whole.

What is claimed is:

1. A driving device for an automobile having axles, driving wheels supported by said axles and an engine located proximate said driving wheels, said engine having a crank-shaft disposed substantially parallel to said axles supporting said driving wheels, the device comprising:

a fluid-type torque converter having coaxial input and output members and disposed on one axial side of said engine with said input member thereof being drivingly connected to and coaxial with said crankshaft;

an auxiliary speed change gear assembly having coaxial input and output members and disposed on one axial side of said torque converter remote from said engine with said input member thereof being drivingly connected to and coaxial with said output member of said torque converter, said output member of said auxiliary speed change gear assembly being provided in the shape of a gear;

a transmission shaft disposed substantially parallel to said auxiliary speed change gear assembly;

a driven gear having a disc portion and toothed peripheral portion supported by said disc portion and drivingly connected to one end of said transmission shaft remote from said torque converter for meshing with said output gear member of said auxiliary speed change gear assembly at said toothed peripheral portion thereof;

a drive gear drivingly connected to the other end of said transmission shaft closer to said torque converter than said one end of said transmission shaft;

a final reduction gear disposed between said driving wheels to be in meshing engagement with said drive gear so as to transmit power from said drive gear to said axles;

a parking gear comprising an annular gear element fixed by bolts proximate said toothed peripheral portion of said driven gear to the axial side surface thereof from which said transmission shaft extends toward said other end, said parking gear being supported by said disc portion of said driven gear for rotation with said driven gear; and means for selectively engaging said parking gear to prevent rotation of said transmission shaft when said automobile is in parking condition.

2. The driving device of claim 1 wherein the diameter of said parking gear is smaller than the diameter of said driven gear.

3. The driving device of claim 2 wherein the outside diameter of said parking gear is less than the diameter of the disc portion of said driven gear.

4. The driving device of claim 1 wherein said driven gear is formed with an annular shoulder in said axial side surface proximate said toothed outer peripheral portion and said annular gear element is fitted onto said shoulder.

* * * * *